United States Patent
Yokoi

(10) Patent No.: US 7,756,295 B2
(45) Date of Patent: Jul. 13, 2010

(54) CHANGE REGION DETECTION DEVICE AND CHANGE REGION DETECTING METHOD

(75) Inventor: Kentaro Yokoi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 898 days.

(21) Appl. No.: 11/604,305

(22) Filed: Nov. 27, 2006

(65) Prior Publication Data

US 2007/0127817 A1    Jun. 7, 2007

(30) Foreign Application Priority Data

Dec. 1, 2005    (JP)    ............... 2005-348530

(51) Int. Cl.
G06K 9/00    (2006.01)
G06K 9/62    (2006.01)
G06K 9/46    (2006.01)
H04N 5/14    (2006.01)
H04N 9/64    (2006.01)

(52) U.S. Cl. ............. 382/103; 382/107; 382/159; 382/203; 382/236; 348/699; 348/700

(58) Field of Classification Search ........... 382/103, 382/107, 159, 181, 203, 209, 210, 236; 348/699, 348/700

See application file for complete search history.

(56) References Cited

FOREIGN PATENT DOCUMENTS

JP    2003-162724    6/2003

OTHER PUBLICATIONS

Li et al., Integrating Intensity and Texture Differences for Robust Change Detection, 2002, IEEE transactions on image processing, vol. 11, No. 2, pp. 105-112.*

Yutaka Sato et al., "Robust Object Detection and Segmentation by Peripheral Increment Sign Correlation Image," Institute of Electronics, Information and Communication Engineers Transactions, vol. J84-D-II, No. 12, pp. 2585-2594 (2001).

Kentaro Toyama et al., "Wallflower: Principles and Practice of Background Maintenance," Proceedings of the 7$^{th}$ IEEE International Conference on Computer Vision (ICCV 1999), pp. 255-261 (Sep. 1991).

* cited by examiner

*Primary Examiner*—John B Strege
(74) *Attorney, Agent, or Firm*—Finnegan, Henderson, Farabow, Garrett & Dunner, L.L.P.

(57) ABSTRACT

A device includes a first change detection unit which detects a change region distribution based on the texture information; a second change detection unit which detects a change region distribution based on a background differential method; a texture detection unit, a change-detection-unit weighting storage unit, and a change detection result integration unit, wherein while applying a firm texture differential method to the illumination change as much as possible, a detection unit based on a background differential method is applied to a region to which the texture differential method is not favorably applicable.

18 Claims, 14 Drawing Sheets

FIG. 6

| INVADING OBJECT \ BACKGROUND | PLAIN (SAME BRIGHTNESS) | PLAIN (DIFFERENT BRIGHTNESS) | TEXTURE (SAME BRIGHTNESS) | TEXTURE (DIFFERENT BRIGHTNESS) |
|---|---|---|---|---|
| PLAIN (STABLE ILLUMINATION) | △ | △ | ◎ | ◎ |
| PLAIN (ILLUMINATION CHANGE) | △ | △ | ◎ | ◎ |
| TEXTURE (STABLE ILLUMINATION) | ◎ | ◎ | ◎ | ◎ |
| TEXTURE (ILLUMINATION CHANGE) | ◎ | ◎ | ◎ | ◎ |

FIG. 7

| INVADING OBJECT \ BACKGROUND | PLAIN (SAME BRIGHTNESS) | PLAIN (DIFFERENT BRIGHTNESS) | TEXTURE (SAME BRIGHTNESS) | TEXTURE (DIFFERENT BRIGHTNESS) |
|---|---|---|---|---|
| PLAIN (STABLE ILLUMINATION) | △ | [121] ◎ | △ | ◎ |
| PLAIN (ILLUMINATION CHANGE) | [122] × | [123] × | × | × |
| TEXTURE (STABLE ILLUMINATION) | △ | ◎ | △ | ◎ |
| TEXTURE (ILLUMINATION CHANGE) | × | × | × | × |

CHANGE REGION DETECTION DEVICE AND CHANGE REGION DETECTING METHOD

CROSS-REFERENCE TO RELATED APPLICATIONS

This application is based upon and claims the benefit of priority from the prior Japanese Patent Application No. 2005-348530, filed on Dec. 1, 2005; the entire contents of which are incorporated herein by reference.

TECHNICAL FIELD

The present invention relates to a change region detection device and a change region detecting method on an image processing technique for extracting a region in which abnormality or change is generated by comparing a learned image in a normal situation and a present inputted image.

BACKGROUND OF THE INVENTION

As conventional change region detecting methods, following methods may be named.

The first method is a background differential method in which a change region is detected based on the brightness difference between a learned average background image and an inputted image (Kentaro Toyama, John Krumm, Barry Brumitt, and Brian Meyers. Wallflower: Principles and practice of background maintenance. Proceedings of the $7^{th}$ IEEE International Conference on Computer Vision (ICCV 1999), PP. 255-261, September 1999. 1).

The second method is a texture differential method in which a change region is detected based on difference between a learned background texture and an inputted image texture (Yutaka Sato, Shunichi Kaneko and Satoru Igarashi. Robust Object Detection and Separation Based on Peripheral Increment Sign Correlation Image. Institute of Electronics, Information and Communication Engineers Transactions, Vol. J84-D-II, No. 12, PP. 2585-2594, 2001. Hereinafter, referred to as "SATO").

The third method is a method which, based on the magnitude of an edge amount of a learned background, determines a change region based on the lowness of normalized correlation and an edge decrease quantity with respect to a region of large edge quantity, and determines the change region based on the edge increase quantity with respect to a region of small edge quantity (JP-A-2003-162724).

However, the background differential method which constitutes the first method has a drawback that the whole brightness change attributed to the illumination change is erroneously detected as the change attributed to a figure or the like.

The texture differential method which constitutes the second method may sufficiently cope with the change of brightness and may perform a small number of erroneous detections but has a drawback that the accurate detection cannot be performed when neither a background nor a figure or the like has texture.

The third method determines the change range based on the increase or decrease of the edge and hence, the method has a drawback that the accurate detection cannot be performed when neither a background nor an invading object or the like has texture.

Accordingly, it is an object of the present invention to provide a change region detection device and a change region detecting method which can prevent the omission of detection while suppressing errors in detecting a change region.

BRIEF SUMMARY OF THE INVENTION

According to embodiments of the present invention, there is provided a change region detection device which detects a change region in an inputted image by comparing a learned background image and the inputted image, wherein the change region detection device includes a first change detection part which detects a first change region distribution based on the difference between a spatial change pattern of pixel values of the learned background image and the spatial change pattern of pixel values of the inputted image, a second change detection part which detects a second change region distribution based on the difference between the brightness information of the learned background image and the brightness information of the inputted image, a spatial frequency detection part which detects information on spatial frequencies in respective regions in the learned background image, a weighting calculation part which calculates, for each pixel in the inputted image, a first weight parameter for the first change region distribution and a second weight parameter for the second change region distribution such that the first weight parameter is larger than the second weight parameter in a region where a component having a relatively high spatial frequency is stronger than a criterion based on the information on the spatial frequencies in the respective regions, and an integration part which calculates an integrated change region distribution by integrating the first change region distribution and the second change region distribution based on the first and second weight parameters.

The present invention can prevent the omission of detection by suppressing the erroneous detection of the change region.

BRIEF DESCRIPTION OF THE DRAWINGS

FIG. 6 is a view of an example showing a detection result obtained by a change detection unit using texture information;

FIG. 7 is a view of an example showing a detection result obtained by a change detection unit using a background differential method;

DETAILED DESCRIPTION OF THE INVENTION

Respective embodiments of a change region detection device according to the present invention are explained in conjunction with drawings.

First Embodiment

A change region detection device of a first embodiment according to the present invention is explained in conjunction with FIG. 1 to FIG. 8.

Figure 1:
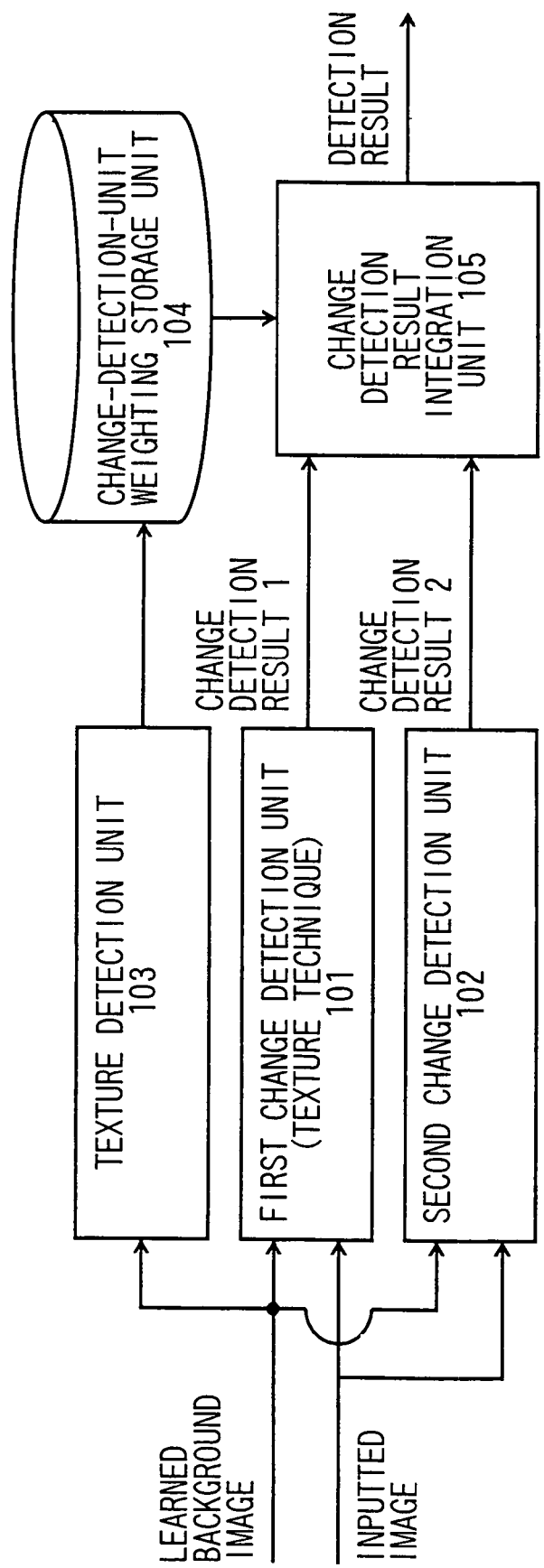
FIG. 1 is a whole constitutional view of a first embodiment of the present invention.
Figure 2:
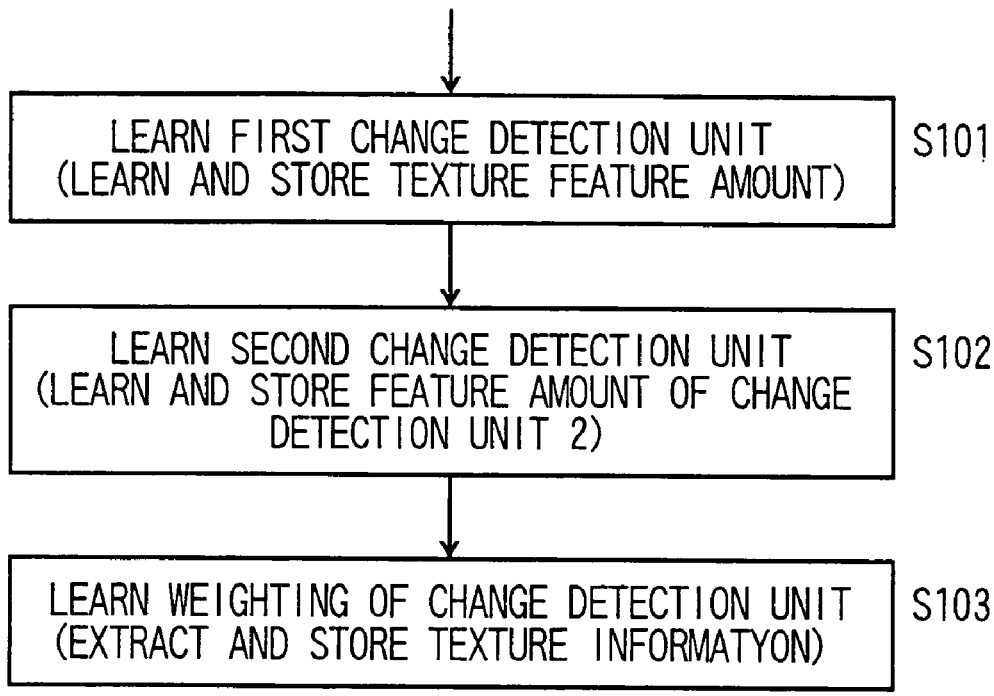
FIG. 2 is a flow chart of learning processing.
Figure 3:
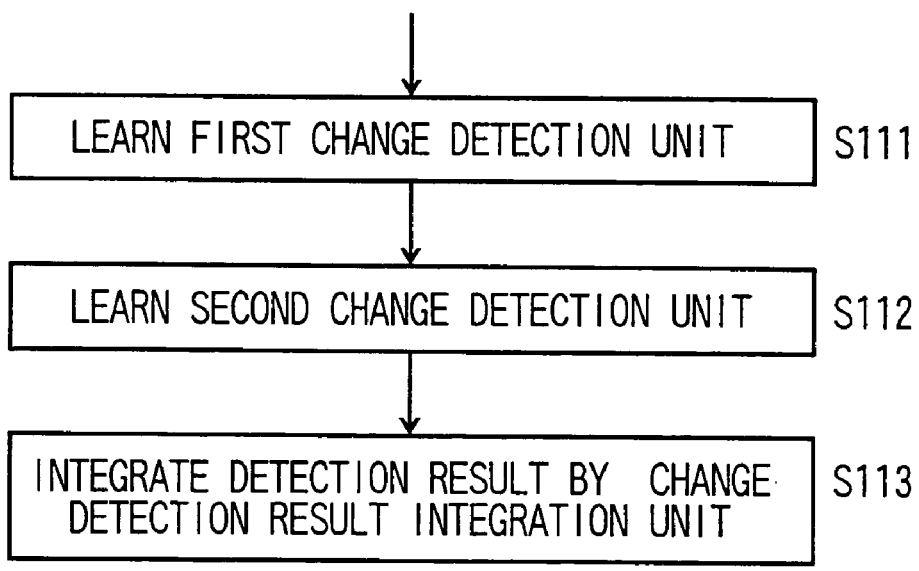
FIG. 3 is a flow chart of detection processing.
Figure 4:
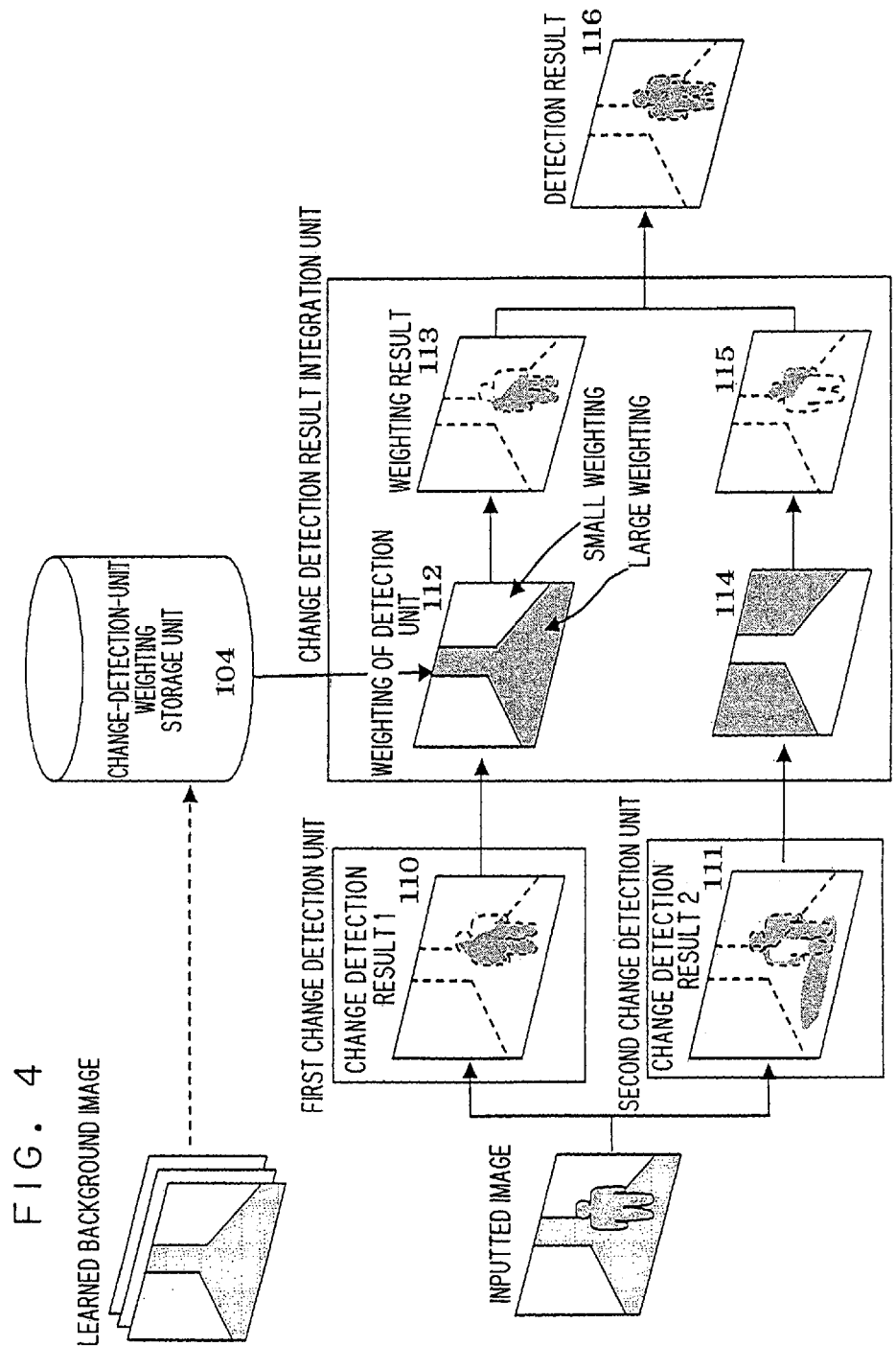
FIG. 4 is a schematic view of the first embodiment.

FIG. 1 is a block diagram showing the whole constitution of the change region detection device according to this embodiment, FIG. 2 is a schematic view showing a flow of learning processing, FIG. 3 is a schematic view showing a flow of detection processing, and FIG. 4 is a schematic view showing this embodiment.

(1) The Constitution of the Change Region Detection Device

The change region detection device shown in FIG. 1 includes a first change detection unit 101 which detects a change region based on texture information, a second change detection unit 102 which detects the change region based on a background differential method, a texture detecting unit 103, a change-detection-unit weighting storage unit (hereinafter, simply referred to as a storage unit) 104 and a change detection result integration unit (hereinafter, referred to as an integration unit) 105.

Here, functions of respective unit of this embodiment are realized based on a program stored in a computer.

Here, "texture information" is information on whether a pattern or the like exists or whether the number of patterns is large or small and when the texture information includes patterns or the like, the spatial frequency of an image is increased.

(2) Learning Processing

First of all, in the learning processing, the first change detection unit 101 performs learning and storing of the texture feature amount (step S101).

The first change detection unit 101 is a unit which detects the change based on the texture information.

The detection of the change based on the texture information implies the detection of the change by focusing on the difference in texture by suppressing the difference in illumination conditions.

In general, in many cases, the feature of the texture appears in a component having a relatively high spatial frequency, while the difference in the illumination conditions appears in a component having a relatively low spatial frequency. In other words, the detection of the change between images based on the texture information implies the detection of the change based on the change between images on the component having the relatively high spatial frequency. Here, a boundary between the above-mentioned "relatively high" and "relatively low" may be directly determined based on a threshold value or may be indirectly determined based on the characteristic of the change detection technique.

The change of the component having the relatively high spatial frequency between images may be examined by comparing a pattern of a spatial change of a pixel value between images. As the pattern of the spatial change of the pixel value, for example, a spatial frequency component which is obtained by applying the frequency conversion to each image or a differential of the pixel value with respect to the neighboring pixel or another pixel may be named.

Among a plurality of images which is obtained by imaging objects having the same texture under different illumination conditions, patterns of the spatial change of the pixel value are hardly changed. To the contrary, among a plurality of images which is obtained by imaging objects having different textures under the common illumination condition, the patterns of the spatial change of the pixel value differ from each other.

As a unit which detects the change based on the above-mentioned texture information, for example, a normalized correlation method, a subspace method, a peripheral increment sign correlation method or the like can be used.

In the peripheral increment sign correlation method, a target pixel I(x,y) and increment sings with 16 peripheral pixels which are spaced apart from the target pixel I(x,y) by 1 pixel are taken into consideration and following 16-dimensional feature amounts are used (see the above-mentioned literature by SATO).

$$PISC(x, y) = (b_0(x, y), b_1(x, y), \ldots, b_{15}(x, y)) \quad (1)$$

$$b_0(x, y) = \begin{cases} 1 & (I(x+2, y) \geq I(x, y)) \\ 0 & \text{(other)} \end{cases}$$

$$b_1(x, y) = \begin{cases} 1 & (I(x+2, y+1) \geq I(x, y)) \\ 0 & \text{(other)} \end{cases}$$

$$b_{15}(x, y) = \begin{cases} 1 & (I(x+2, y-1) \geq I(x, y)) \\ 0 & \text{(other)} \end{cases}$$

Alternatively, without using the feature amount of a binary value of 0/1, the difference of the brightness value per se may be used.

$$b_0(x,y) = I(x+2,y) - I(x,y) \quad (2)$$

The first change detection unit 101 calculates the feature amounts PISC(x,y) with respect to respective pixels (x,y) of all learned background images and stores an average value $PISC_{learn}(x,y)$ of the feature amounts for every pixel.

Next, the second change detection unit 102 performs learning and storing of the feature amount (step S102).

The second change detection unit 102 is a change detection unit based on a method different from the method on which the first change detection unit 101 is based, and as will be explained later in paragraph (4), is a change detection unit which is capable of detecting the change which is difficult to detect by the first change detection unit 101.

For example, the change detection unit based on the background differential which detects the change based on the brightness information may be used. In the change detection unit based on the background differential, in the learned background image, an average value $I_{learn}(x,y)$ of the pixel brightness I(x, y) of the coordinates (x, y) may be obtained and stored.

Finally, the texture detection unit 103 detects texture from the learned background image and the storage unit 104 stores a weighting coefficient based on the detected texture amount (FIG. 2, step S103).

In detecting the texture amount, it may be possible to use a value which is obtained by averaging outputs of a filter which extracts edges such as a differential filter, a Sobel filter, a Laplacian filter or the like, for example, in a nearby region.

When the differential filter is used, assuming the brightness of the pixel having the coordinates (x,y) as I(x,y), the nearby region of (x,y) as an Area(x,y), the number of pixels in the inside of the Area(x,y) as num(Area(x,y)), and a differential filter output value of the pixel (s,t) in the inside of the Area (x,y) as T' (s,t), a value T(x,y) which indicates a following texture amount may be used.

$$T(x, y) = \frac{1}{num(Area(x, y))} \sum_{(s,t) \in Area(x,y)} T'(s, t)$$

$$T'(s, t) = \sqrt{g_v(s, t)^2 + g_h(s, t)^2} \quad \text{(differential filter output)}$$

$$g_v(s,t) = -I(s-1,t-1) - I(s,t-1) - I(s+1,t-1) + I(s-1,t+1) + I(s,t+1) + I(s+1,t+1)$$

(vertical-direction differential)

$$g_h(s,t) = -I(s-1,t-1) - I(s-1,t) - I(s-1,t+1) + I(s+1,t-1) + I(s+1,t) + I(s+1,t+1)$$

(horizontal-direction differential)

A weight $w_1(x,y)$ which is applied to the first change detection unit 101 and a weight $w_2(x,y)$ which is applied to the second change detection unit 102 are determined as follows based on the texture amount T(x,y) and are stored.

$$w_1(x, y) = \begin{cases} 1 & (T(x, y) \geq TH_T)) \\ 0 & \text{(other)} \end{cases}$$

$$w_2(x, y) = 1 - w_1(x, y)$$

Here, for the sake of brevity, the weight $w_1(x,y)$ is set to 1 when the texture is large (T(x,y) being set to a threshold value $TH_T$ or more) and the weight is set to 0 when the texture is small (T(x,y) being less than the threshold value $TH_T$). However, the weight $w_1(x,y)$ may be given a continuous value. As will be explained later in the paragraph (4), the first change detection unit 101 based on the texture information can obtain the high detection performance in a region which has the large texture and hence, the weight can be increased when the texture is large.

(3) Detection Processing

In performing the detection processing, first of all, the first change detection unit 101 detects the change from the inputted image (step S111 in FIG. 3). The first change detection unit 101 extracts the texture feature amount $PISC_i(x,y)$ similar to the formula (1) with respect to the pixel I(x,y) of the inputted image. Then, the first change detection unit 101 detects the change $D_1(x,y)$ based on the difference between the feature amount $PISC_i(x,y) = (b_{i,0}(x,y), \ldots, b_{i,15}(x,y))$ obtained from the inputted image and the feature amount $PISC_{learn}(x,y) = (b_{learn,0}(x,y), \ldots, b_{learn,15}(x,y))$ which is learned and stored.

$$D_1(x, y) = \sum_{n=0}^{15} |b_{learn,n}(x, y) - b_{i,n}(x, y)|$$

When the change $D_1(x,y)$ is equal to or more than a threshold value $TH_1$, it is determined that the change exists (=1), while when the change $D_1(x,y)$ is below the threshold value $TH_1$, it is determined that there is no change (=0) (110 in FIG. 4).

$$Result_1(x, y) = \begin{cases} 1 & (D_1(x, y) \geq TH_1) \\ 0 & \text{(other)} \end{cases}$$

Next, the second change detection unit 102 detects the change from the inputted image (step S112). The second change detection unit 102 compares $I_{learn}(x,y)$ which is obtained by the learning processing and the brightness $I_i(x,y)$ of the inputted image and determines that the change exists when the difference $D_2(x,y)$ is equal to or more than a threshold value $TH_2$ (=1) and determines that there is no change when the difference $D_2(x,y)$ is below the threshold value $TH_2$ (=0) (111 in FIG. 4).

$$Result_2(x, y) = \begin{cases} 1 & (D_2(x, y) \geq TH_2) \\ 0 & \text{(other)} \end{cases} \quad (3)$$

$$D_2(x,y) = |I_{learn}(x,y) - I_i(x,y)|$$

Finally, the integration unit 105 performs the weighting and the integration of the change detection results of the first change detection unit 101 and the second change detection unit 102 in accordance with weighting which the storage unit 104 stores (step S113).

The weighting to the first change detection unit 101 is performed in accordance with an image 112 in FIG. 4, for example, and a detection result which is obtained by adding the weight to the change detection result 110 using such a step becomes an image 113 shown in FIG. 4.

In the same manner, the weighting to the second change detection unit 102 is performed in accordance with an image 114, for example, and a detection result which is obtained by adding the weight to the change detection result 111 using such a step becomes an image 115.

Then, an integrated image Result (x,y) which is a finally integrated detection result becomes an image 116.

$$Result(x,y) = w_1(x,y) * Result_1(x,y) + w_2(x,y) * Result_2(x,y) \quad (4)$$

Alternatively, as will be explained later in the paragraph (4), it may be possible to perform the integration which uses the second change detection unit 102 only in a region having a small texture amount (a region where the weight $w_1(x, y)$ is small, $w_1(x,y) < TH_w$) where the first change detection unit 101 is liable to easily generate the omission of detection.

$$Result(x, y) = \begin{cases} Result_2(x, y) & (Result_1(x, y) = 0 \text{ and } w_1(x, y) < TH_w) \\ Result_1(x, y) & \text{(other)} \end{cases} \quad (5)$$

(4) Selection of Second Change Detection Unit 102

As the second change detection unit 102, it is preferable to use a change detection unit which is capable of detecting the change which is difficult to detect by the first change detection unit 101.

Figure 5:
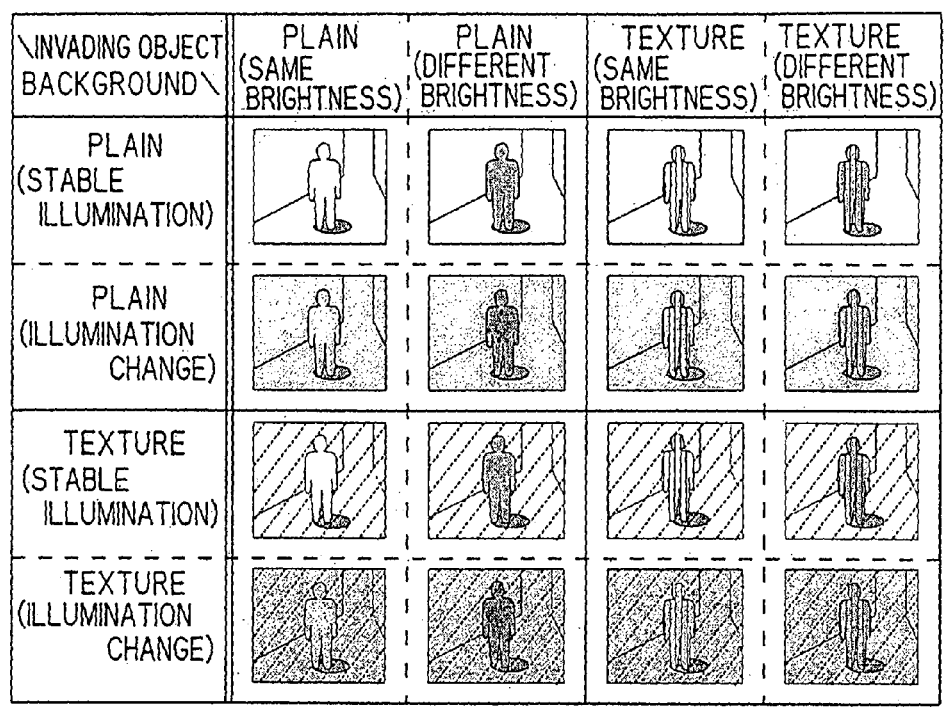
FIG. 5 is a view of an example showing the classification of inputting.

For example, the inputted image may be classified as shown in FIG. 5. First of all, as indicated by an axis of ordinates in the drawing, the inputted image is classified into a case in which the texture is small on the background (plain/stable illumination), a case in which the texture is small and the illumination is changed (plain/illumination change), a case in which the texture is large (texture/stable illumination) and a case in which the texture is large and the illumination is changed (texture/illumination change). Further, as indicated by an axis of abscissas in the drawing, the inputted image is classified into a case in which an invading object has small texture and has the brightness similar to the brightness of the background (plain/same brightness), a case in which the invading object has small texture and has the brightness which differs from the brightness of the background (plain/different brightness), a case in which the invading object has the large texture and has the brightness similar to the brightness of the background (texture/same brightness), and a case in which the invading object has the large texture and has the brightness which differs from the brightness of the background (texture/different brightness).

FIG. 6 is a conceptual view of the detection result obtained by the first change detection unit 101 using the texture information with respect to such an inputted image. In FIG. 6, a black region is a region where the change is detected and a white circle indicates the correct detection, and a white triangle indicates the omission of detection different from an erroneous detection. As can be understood from this drawing, the change detection unit using the texture information generates the omission of detection when both of the background and the invading object exhibit small texture (portions indicated by white triangles in FIG. 6).

On the other hand, FIG. 7 is a conceptual view showing the detection result obtained by the change detection unit which uses the background differential method. "x" in FIG. 7 indicates the occurrence of the erroneous detection. As can be understood from FIG. 7, while the change detection unit using the background differential method cannot accurately detect when the illumination is changed (portion indicated by "x" in FIG. 7), also if the brightness of the background is different from the invading object, the method can accurately detect even when they both exhibit small texture ([121] in FIG. 7).

Accordingly, by using the detection result of the second change detection unit 102 which uses the background differential method only when the omission of detection occurs in the first change detection unit 101 which uses the texture information as shown in the formulae (4), (5), it is possible to reduce the omission of detection while suppressing the erroneous detection to some extent.

(5) Modification

As has been explained in conjunction with the above-mentioned paragraph (4), when the change detection unit using the background differential method is adopted as the second change detection unit 102, there exists a drawback that the erroneous detection occurs when the illumination is changed ([122], [123] in FIG. 7).

Figure 8:
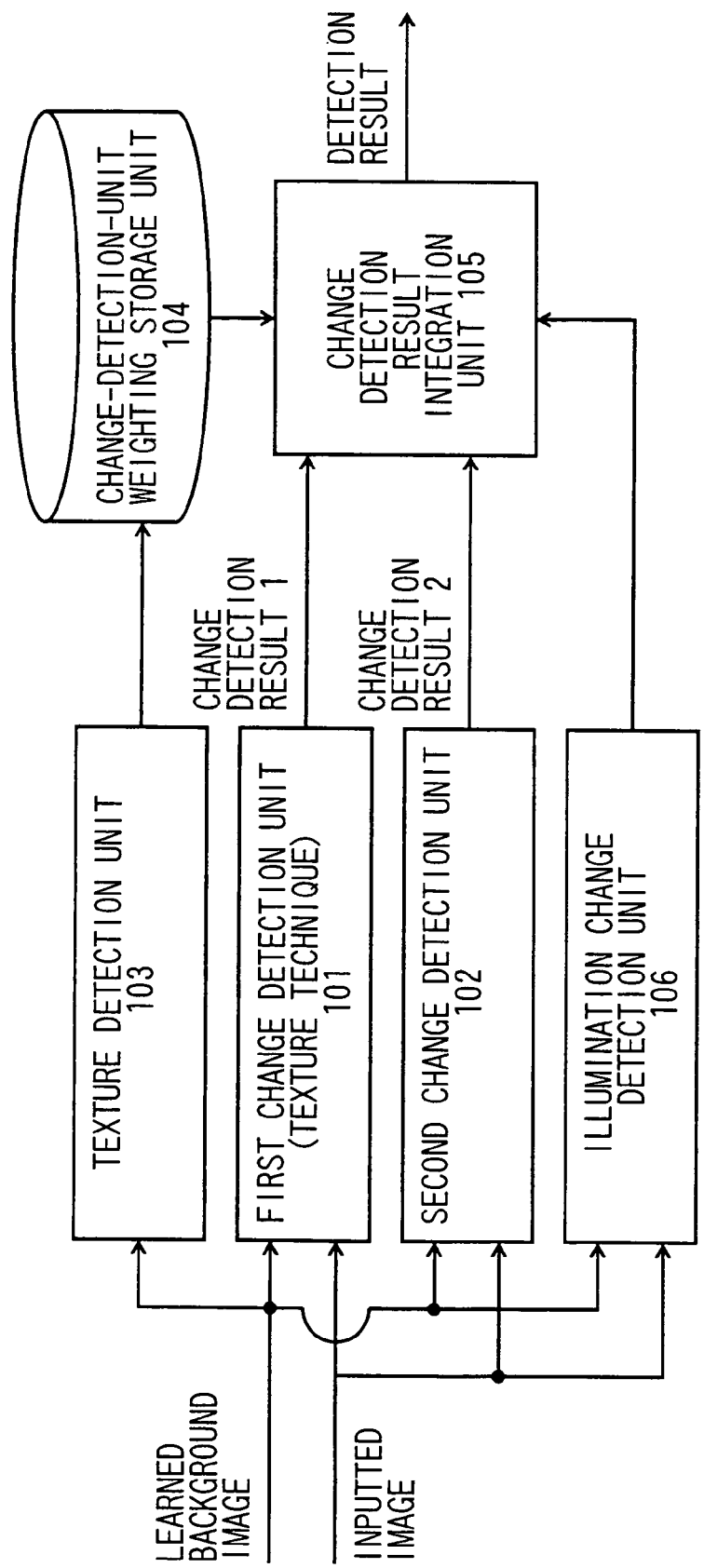
FIG. 8 is a view of a modification of the first embodiment.

Accordingly, as shown in FIG. 8, an illumination change detection unit 106 which detects the illumination change is used and when the illumination change is detected by the illumination change detection unit 106, there exists a high possibility that the second change detection unit 102 performs an erroneous detection and hence, this detection result may be discarded.

The illumination change detection unit 106 performs the change detection in the same manner as the second change detection unit 102 ($Result_2(x,y)$ in the formula (3)), for example, and may determine that the illumination is changed ($Result_3=1$) when the change having an area equal to or larger than a certain threshold value ($TH_3$) is detected.

$$Result_3 = \begin{cases} 1 & (Sum_3 \geq TH_3) \\ 0 & (\text{other}) \end{cases}$$

$$Sum_3 = \sum_{(x,y) \in \text{the whole image}} Result_2(x, y)$$

Then, the integration unit 105, in the integration processing in step S113, uses the detection result $Result_2(x,y)$ of the second change detection unit 102 only when it is determined that the illumination is not changed ($Result_3=0$).

$$Result(x, y) = \begin{cases} Result_2(x, y) & \left( \begin{array}{l} Result_1(x, y) = 0 \text{ and} \\ w_1(x, y) < TH_w \text{ and } Result_3 = 0 \end{array} \right) \\ Result_1(x, y) & (\text{other}) \end{cases} \quad (6)$$

Second Embodiment

Figure 9:
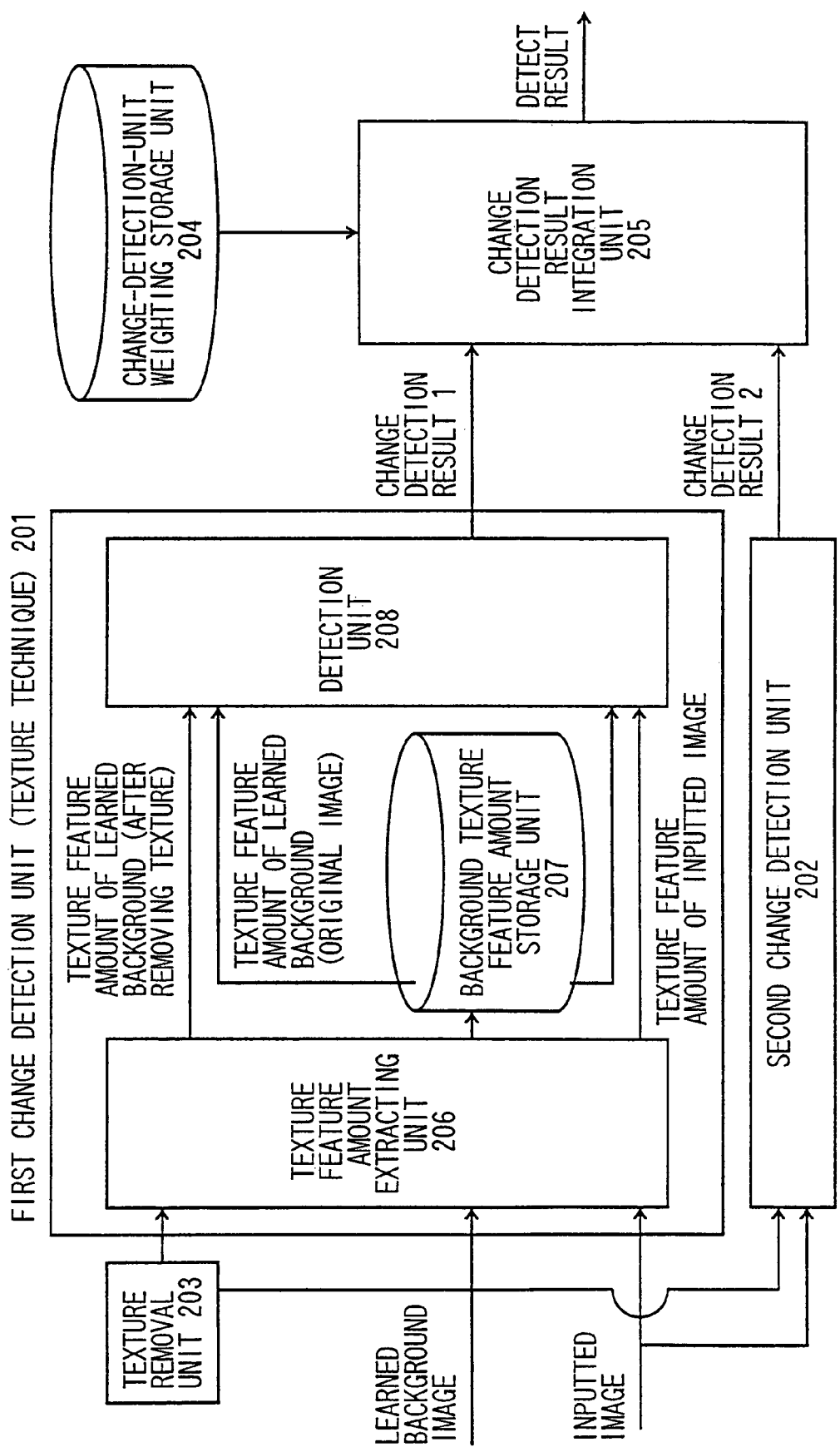
FIG. 9 is a whole constitutional view of a second embodiment.
Figure 10:
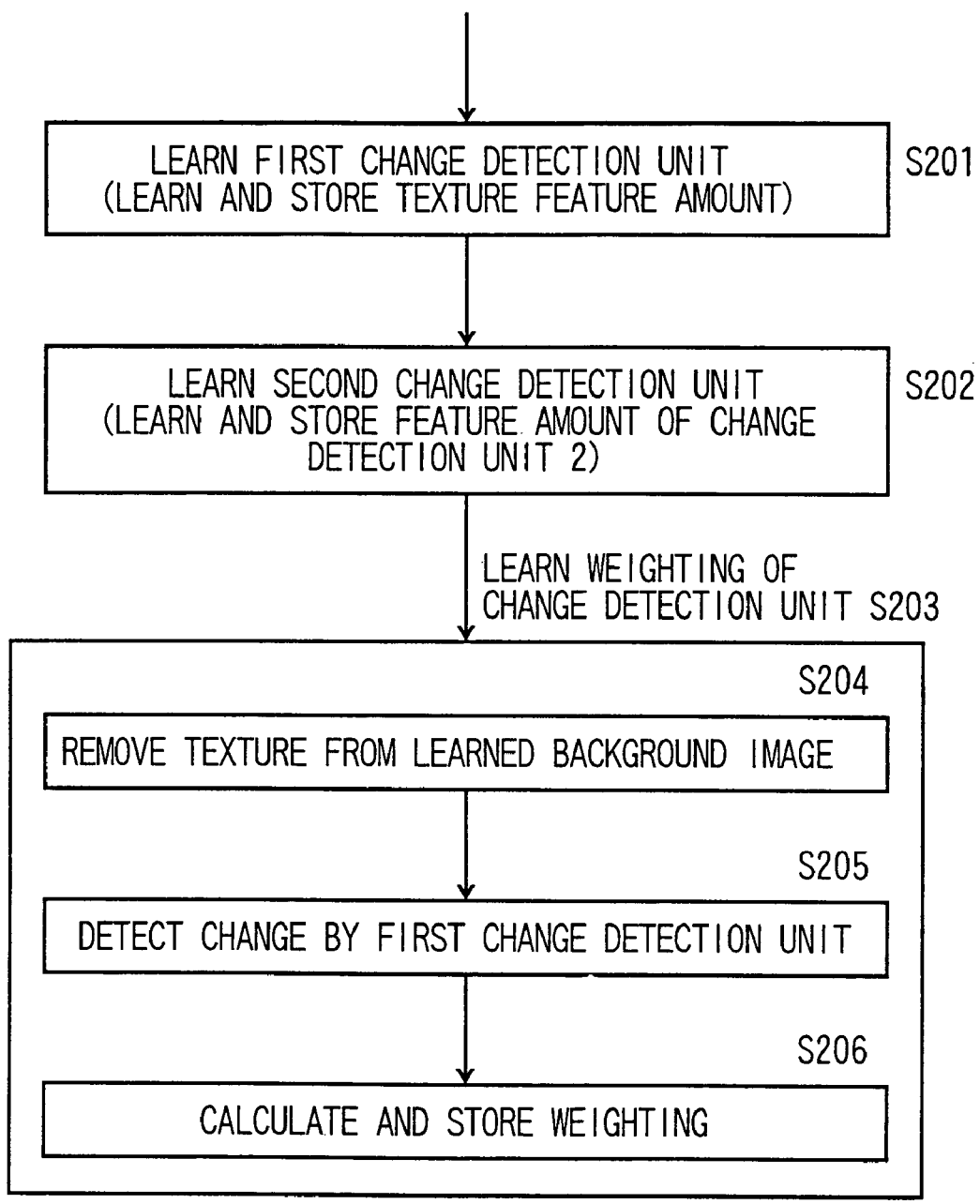
FIG. 10 is a flow chart of learning processing.

A change region detection device of a second embodiment is explained in conjunction with FIG. 9 and FIG. 10.

FIG. 9 is a block diagram showing the whole constitution of this embodiment. The change region detection device shown in FIG. 9 includes a first change detection unit 201 which detects the change based on texture information, a second change detection unit 202, a texture removal unit 203, a storage unit 204, and an integration unit 205.

(1) Learning Processing

The learning processing of this embodiment is substantially equal to the learning processing of the first embodiment shown in FIG. 2 but differs from the learning processing of the first embodiment with respect to the learning processing on weighting in step S103. FIG. 10 shows a flow of the learning processing.

Steps S201, S202 shown in FIG. 10 are substantially equal to the steps S101, S102 shown in FIG. 2.

Next, in step S203, the texture removal unit 203 removes the texture from the learned background image (step S204). This step can be executed by performing blurring processing using a smoothing filter, a Gaussian filter or the like. For example, when the 3×3 Gaussian filter is used, the brightness I(x,y) of a point on the coordinates (x,y) is calculated as follows.

$$I(x, y) = 1/16 \begin{Bmatrix} 1*I(x-1, y-1) + 2*I(x, y-1) + \\ 1*I(x+1, y-1) + 2*I(x-1, y) + \\ 4*I(x, y) + 2*I(x+1, y) + \\ 1*I(x-1, y+1) + 2*I(x, y+1) + \\ 1*I(x+1, y+1) \end{Bmatrix}$$

Next, the first change detection unit 201 performs the change detection with respect to the learned background image (after removing texture) based on the background texture feature amount which is learned using the learned background image (original image) (step S205). This processing is substantially equal to the corresponding processing of the first embodiment. With respect to the learned background image (after removing the texture), the texture is removed with respect to the region where the texture is large by the texture removal unit 203 and the change is generated from the original image and hence, the change can be detected. On the other hand, the change by the texture removal unit 203 is small with respect to the region which has small texture and hence, the change is hardly detected. That is, the region where the change is detected in step S205 indicates the region where the texture amount is large and hence, the weight is calculated as below, and the calculated weight is stored in the storage unit 204 (step S206).

$$w_1(x, y) = \begin{cases} 1 & \text{(change detection)} \\ 0 & \text{(other)} \end{cases}$$

$$w_2(x, y) = 1 - w_1(x, y)$$

As described above, by calculating the weighting applied to the first change detection unit 201 based on the change detection result obtained by the first change detection unit 201, it is possible to perform the weighting which directly reflects the change detection performance of the first change detection unit 201. On the other hand, according to the case described in the first embodiment, the texture region which the first change detection unit 101 performs the change detection performance and the texture region which the texture detection unit 103 detects do not always agree to each other thus giving rise to a possibility that the erroneous detection or the omission of the detection is liable to easily occur.

Third Embodiment

Figure 11:
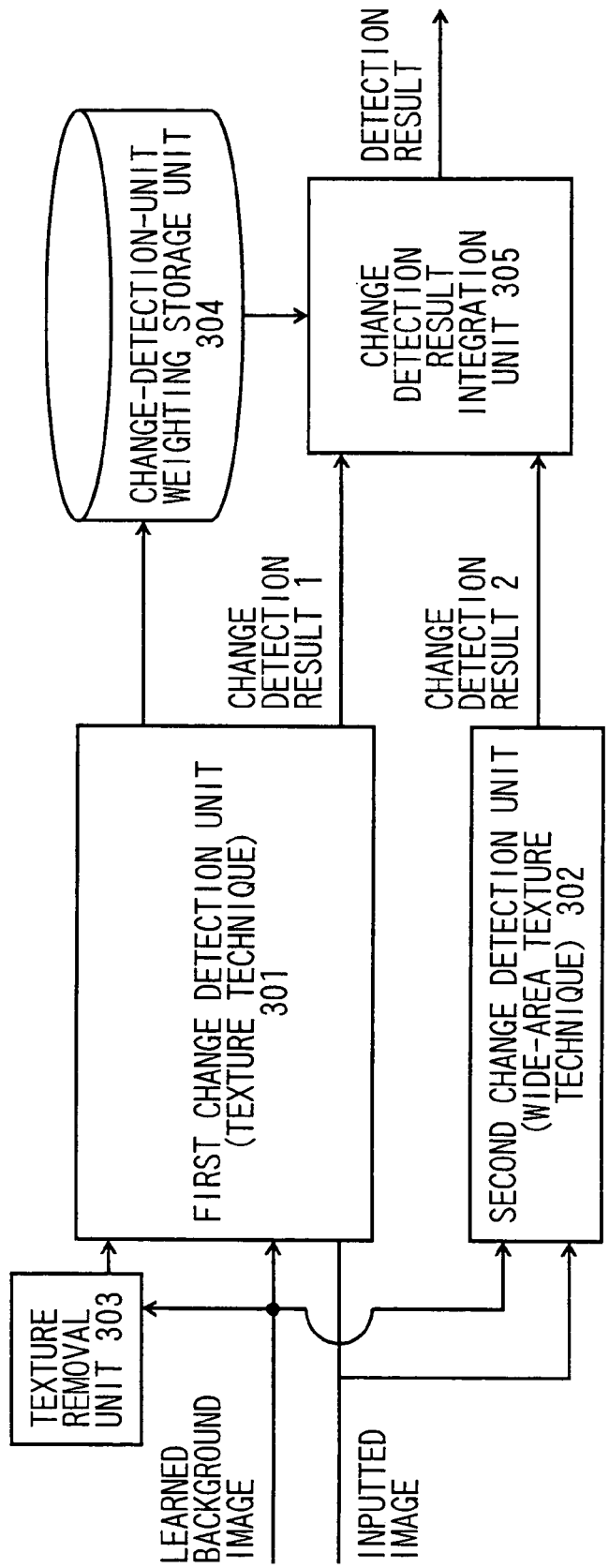
FIG. 11 is a whole constitutional view of a third embodiment.
Figure 12:
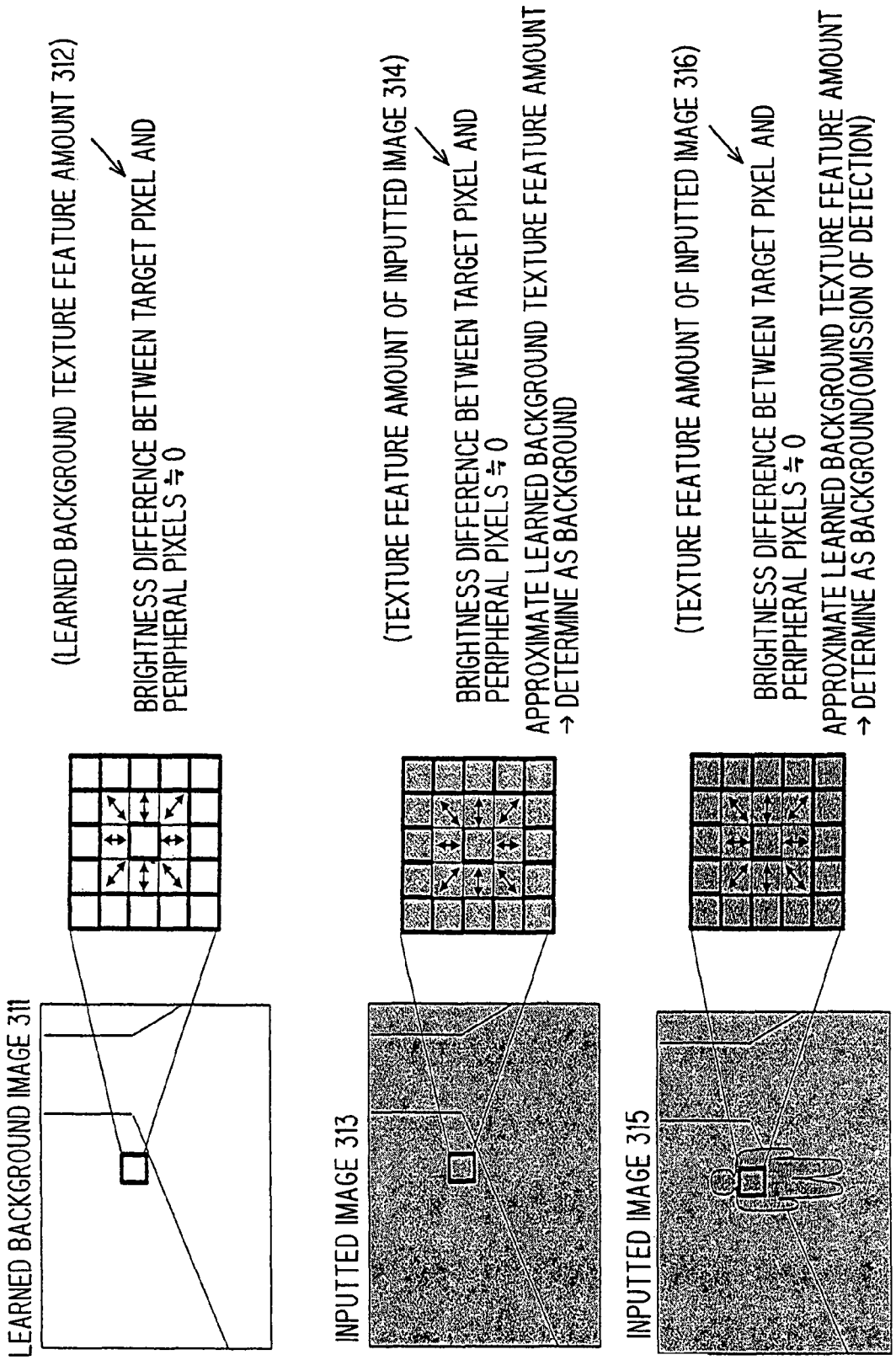
FIG. 12 a view showing a drawback of a change detecting method using texture information.
Figure 13:
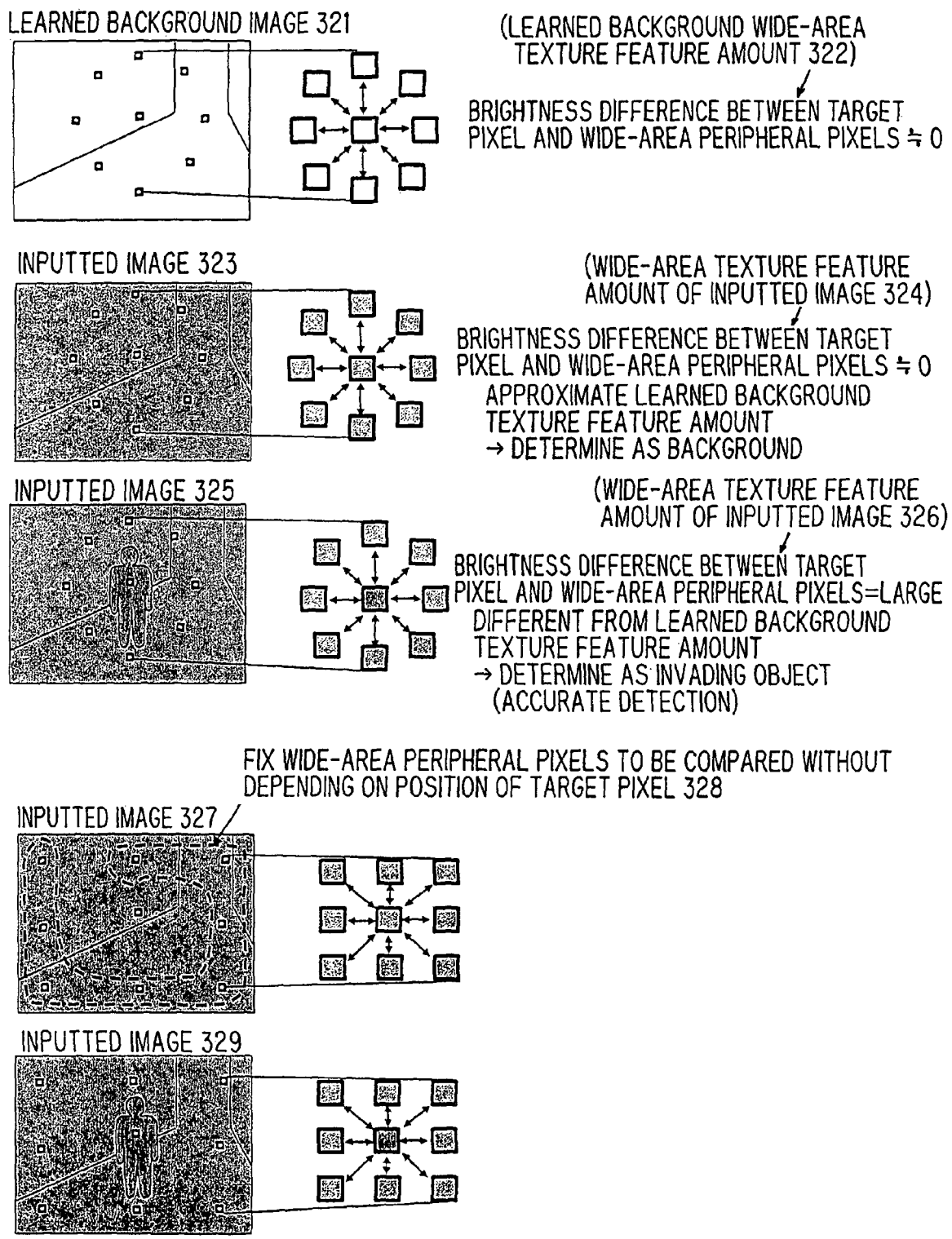
FIG. 13 is a conceptual view of the change detecting method based on wide-area texture information.

A change detection device of a third embodiment is explained in conjunction with FIG. 11 to FIG. 13.

FIG. 11 is a block diagram showing the whole constitution of this embodiment. The change region detection device shown in FIG. 11 includes a first change detection unit 301 which detects the change based on texture information, a second change detection unit 302 which detects the change based on texture information extracted from a region wider than the first change detection unit 301, a texture removal unit 303, a storage unit 304, and an integration unit 305.

Although the third embodiment has substantially the same constitution as the second embodiment shown in FIG. 9, this embodiment differs from the second embodiment with respect to a point that as the change detection unit, a change detection unit which detects the change based on the texture information extracted from the wide region is used. Accordingly, the explanation is made by focusing on portions which differ from the above-mentioned first embodiment and the second embodiment.

(1) Summary of the Change Detection Unit Based on Wide-Area Texture Information

As explained in the paragraph (4) of the first embodiment, the change detection unit based on the texture information generates the omission of detection when both of the background and the invading object exhibit small texture (see FIG. 12).

For example, with respect to the texture feature amount in the formula (1) which is learned from the learned background image 311, the PISC(x,y) becomes substantially equal to (0, 0, ... 0) as in the case of texture feature amount 312. That is, the texture feature amount becomes substantially equal to the texture feature amount 314 obtained from the inputted image 313 and approximates the learned background texture feature amount 312 and hence, it is accurately determined that there is no change. On the other hand, the texture feature amount obtained based on the inputted image 315 becomes a texture feature amount 316 and also approximates the learned background texture feature amount 312 and hence, it is erroneously determined that there is no change thus giving rise to the occurrence of omission of the detection.

Accordingly, the comparison is made between the target pixel and the pixels which are sufficiently spaced apart from the target pixel (wide-area peripheral pixels) in place of the pixels around the target pixel (the detail of processing described later, see FIG. 13).

With respect to the texture feature amount of the formula (1) which is learned from the learned background image 321, the PISC(x,y) becomes substantially equal to (0, 0, ..., 0) as in the case of a texture feature amount 322 shown in FIG. 13. The texture feature amount which is obtained from the inputted image 323 becomes a texture feature amount 324, wherein since the texture feature amount 324 approximates the learned background texture feature amount 322, it is accurately determined that there is no change. Further, the texture feature amount obtained by the inputted image 325 becomes a texture feature amount 326 and hence, the brightness difference between the target pixel and the wide-area peripheral pixel is increased whereby the texture feature amount 326 becomes largely different from the learned background texture feature amount 322, and it is accurately determined that the change exists.

Further, in the above-mentioned processing, when the target pixel is moved, the wide-area peripheral pixel to be compared with the target pixel is also moved corresponding to the movement of the target pixel and hence, the reference to values in the wide range becomes necessary. Accordingly, as in the case indicated by numeral 328 in FIG. 13, the wide-area peripheral pixels to be compared may be fixed irrespective of the position of the target pixel. Also in this case, it is possible to obtain the substantially equal wide-area texture feature amounts 322, 324, 326 and the substantially equal detection results as the above-mentioned processing. Further, in this case, since the wide-area peripheral pixel to be compared is fixed, it is possible to restrict the reference range of the pixels. Accordingly, by providing a storage device (for example, a cache memory) which can refer these reference values at a high speed, it is possible to perform the high-speed processing. Here, with respect to the wide-area peripheral pixels which are arranged at the fixed positions, the wide-area peripheral pixels on the whole screen may be used as in the case 328 shown in FIG. 13 or only the wide-area peripheral pixels which fall within a fixed range from the target pixel may be used among all of the wide-area peripheral pixels in the whole screen.

Figure 14:
FIG. 14 is a conceptual view of a detection result obtained by a change detection unit using wide-area texture information.

Compared to the classification of the inputted image shown in FIG. 5, FIG. 14 is a conceptual view of a detection result by the change detection unit which uses the wide-area texture information. By using the wide-area texture information (see FIG. 14) in the region where the omission of detection occurs when the texture information is used (see FIG. 6), it is possible to accurately detect the change region ([331], [332] in FIG. 14). Further, the erroneous detection attributed to the illumination change is less than the case of using the background differential method ([122], [123] in FIG. 7).

(2) Learning Processing of the Change Detection Unit Based on the Wide-Area Texture Information Although a flow of the learning processing in the third embodiment is substantially equal to the processing of the second embodiment (see FIG. 10), the third embodiment differs from the second embodiment with respect to the learning of the second change detection unit (step S202). In the third embodiment, a second change detection unit 302 based on the wide-area texture information is used as the second change detection unit.

Figure 15:
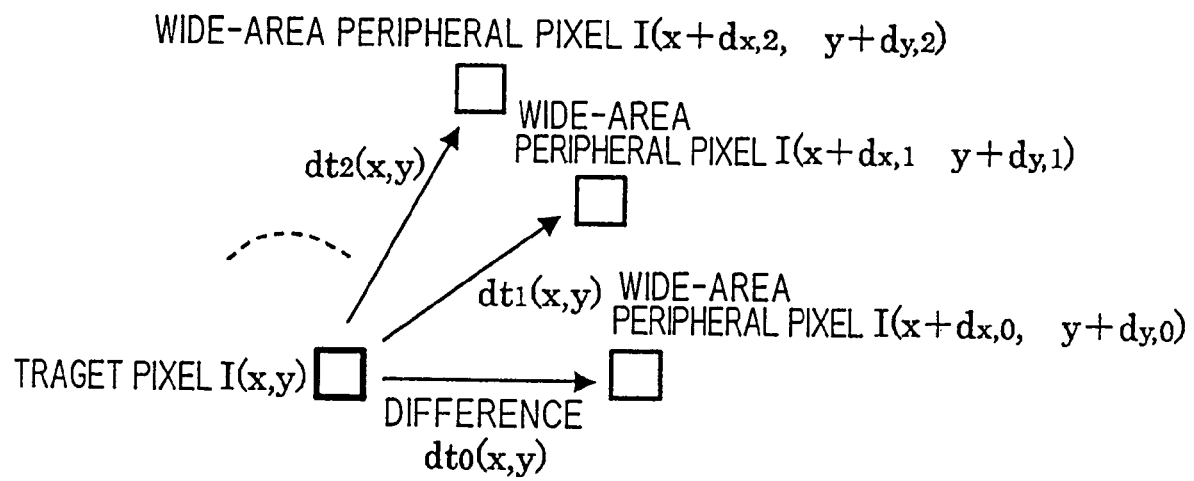
FIG. 15 is a conceptual view of feature amounts of the change detecting method based on wide-area texture information.

The second change detection unit 302 takes the difference between the target pixel I(x,y) and N pieces of wide-area peripheral pixels which are spaced apart from the target pixel I(x, y) by a sufficient distance D and calculates the following N-dimensional feature amount DT(x,y) (see FIG. 15).

$$DT(x,y)=(dt_0(x,y),dt_1(x,y), \ldots , dt_N(x,y)) \quad (7)$$

$$dt_0(x,y)=I(x+d_{x,0},y+d_{y,0})-I(x,y)$$

$$dt_1(x,y)=I(x+d_{x,1},y+d_{y,1})-I(x,y)$$

.
.
.

$$dt_N(x,y)=I(x+d_{x,N},y+d_{y,N})-I(x,y)$$

($d_{x,i}$, $d_{y,i}$ are offsets provided for using pixels spaced apart from (x,y) by distance D)

DT(x,y) is obtained with respect to all learned background images, and an average of the DT(x,y) is stored as the feature amount $DT_{learn}(x,y)$ of the background image.

With respect to the distance D between the target pixel and the wide-area peripheral pixel, although the distance D which is common to all wide-area peripheral pixels may be set, when the invading object is a figure in most cases, for example, a shape of the figure which is elongated in the vertical direction is reflected and the large distance D is set with respect to the wide-area peripheral pixels in the vertical direction, while the small distance D may be set with respect to the wide-area peripheral pixels in the lateral direction.

(3) Detection Processing of Change Detection Unit Based on Wide-Area Texture Information Although a flow of the detection processing in the third embodiment is substantially equal to the processing of the second embodiment (see FIG. 3), the third embodiment differs from the second embodiment with respect to the detection by the second change detection unit (step S112).

The second change detection unit 302 calculates, with respect to the inputted image, the N-dimensional feature amount $DT_1(x,y)=(dt_{i,0}(x,y),dt_{i,1}(x,y), \ldots , dt_{i,N}(x,y))$ similar to the formula (7). The differences between these values and the feature amount $DT_{learn}(x,y)=(dt_{learn,0}(x,y), \ldots , dt_{learn,N}(x,y))$ which is calculated in the learning processing is calculated. When a pair which has such differences of equal to or more than a threshold value $TH_{DT}$ exhibits a fixed TH or more, it is determined that the change exists (Result$_2$=1).

$$Result_2(x, y) = \begin{cases} 1 & \left(\sum_{n=0}^{N} DT_n(x, y) \geq TH\right) \\ 0 & \text{(other)} \end{cases}$$

$$DT_n(x, y) = \begin{cases} 1 & (|dt_{learn,n}(x, y) - dt_{i,n}(x, y)| \geq TH_{DT}) \\ 0 & \text{(other)} \end{cases}$$

The present invention is applicable, for example, to the detection of an area of an invader in image monitoring or the detection of a region of a figure for recognition of the motion capture gesture.

What is claimed is:

1. A device for detecting a change region in an inputted image, the device comprising:
    a first change detector which detects a first change region distribution based on the difference between a spatial change pattern of a pixel value of a learned background image and a spatial change pattern of a pixel value of the inputted image;
    a second change detector which detects a second change region distribution based on the difference between brightness information of the learned background image and brightness information of the inputted image;
    a spatial frequency detector which detects information on spatial frequencies in respective regions in the learned background image,
    a weighting calculator which calculates, for each pixel in the inputted image, a first weight parameter for the first change region distribution and a second weight parameter for the second change region distribution such that the first weight parameter is larger than the second weight parameter in a region where a component having a relatively high spatial frequency is stronger than a criterion based on the information on the spatial frequencies in the respective regions; and
    an integrating calculator which calculates an integrated change region distribution by integrating the first change region distribution and the second change region distribution based on the first and second weight parameters.

2. A device according to claim 1, wherein the second change detector detects the second change region distribution based on the brightness differences between the respective pixels of the learned background image and the respective pixels of the inputted image.

3. A device according to claim 1, wherein the device further includes an illumination change detector which detects the illumination change generated in the inputted image, and the integrating calculator reduces the weight parameter of the second change region distribution when the illumination change is detected than when the illumination change is not detected.

4. A device according to claim 1, wherein the spatial frequency detector includes:
    a remover which obtains a removed learned background image by removing a component having relatively high spatial frequency from the learned background image;
    a first feature amount calculator which calculates a feature amount based on the spatial change pattern of the pixel value of the learned background image; and
    a second feature amount calculator which calculates a feature amount based on the spatial change pattern of the pixel value of the removed learned background image, wherein
    the weighting calculator calculates the first and second weight parameters such that the first weight parameter is larger than the second weight parameter in a region where the difference between the feature amounts is larger than a criterion when the feature amount calculated based on the learned background image and the feature amount calculated from the removed learned background image are compared with each other.

5. A device according to claim 1, wherein the second change detector detects the second change region distribution based on a change of brightness difference between a target pixel in the inputted image and a plurality of reference pixels which are arranged at positions spaced apart from the target pixel at least by a distance larger than an average size of an object to be detected in the inputted image.

6. A device according to claim 1, wherein the second change detector detects the second change region distribution based on a change of brightness difference between a target pixel in the inputted image and a plurality of pixels at preset positions.

7. A method for detecting a change region in an inputted image, the method comprising the steps of:
    detecting a first change region distribution based on the difference between a spatial change pattern of a pixel value of a learned background image and a spatial change pattern of a pixel value of the inputted image;
    detecting a second change region distribution based on the difference between brightness information of the learned background image and brightness information of the inputted image;
    detecting information on spatial frequencies in respective regions in the inside of the learned background image,
    calculating, for each pixel in the inputted image, a first weight parameter for the first change region distribution and a second weight parameter for the second change region distribution such that the first weight parameter is larger than the second weight parameter in a region where a component having a relatively high spatial frequency is stronger than a criterion based on the information on the spatial frequencies of the respective regions; and
    calculating an integrated change region distribution by integrating the first change region distribution and the second change region distribution based on the first and second weight parameters.

8. A method according to claim 7, wherein the detection of the second change region distribution is performed based on the brightness differences between the learned background image and the respective pixels of the inputted image.

9. A method according to claim 7, wherein the illumination change generated in the inputted image is further detected, and the calculation of the integrated change region distribution is performed such that the weight parameter of the second change region distribution is reduced when the illumination change is detected than when the illumination change is not detected.

10. A method according to claim 7, wherein detection of the information on the spatial frequency is performed such that (1) a removed learned background image is obtained by removing a component having relatively high spatial frequency from the learned background image, (2) a feature amount is calculated based on the spatial change pattern of the pixel value of the learned background image, and (3) a feature amount is calculated based on the spatial change pattern of the pixel value of the removed learned background image, wherein
    the calculation of the first and second weight parameters is performed such that the first weight parameter is larger than the second weight parameter in a region where the difference between the feature amounts is larger than a criterion when the feature amount calculated based on the learned background image and the feature amount calculated from the removed learned background image are compared with each other.

11. A method according to claim 7, wherein the detection of the second change region distribution is performed based on a change of brightness difference between a target pixel in the inputted image and a plurality of reference pixels which are arranged at positions spaced apart from the target pixel at least by a distance larger than an average size of an object to be detected in the inputted image.

12. A method according to claim 7, wherein the detection of the second change region distribution is performed based on a change of brightness difference between a target pixel in the inputted image and a plurality of pixels at preset positions.

13. A tangible computer readable medium storing a program for detecting a change region in an inputted image which is executed by a computer, the program comprising the instructions of:
    detecting a first change region distribution based on the difference between a spatial change pattern of a pixel value of a learned background image and a spatial change pattern of a pixel value of the inputted image;
    detecting a second change region distribution based on the difference between brightness information of the learned background image and brightness information of the inputted image;
    detecting information on spatial frequencies in respective regions in the inside of the learned background image,
    calculating, for each pixel in the inputted image, a first, a first weight parameter for the first change region distribution and a second weight parameter for the second change region distribution such that the first weight parameter is larger than the second weight parameter in a region where a component having a relatively high spatial frequency is larger than a criterion based on the information on the spatial frequencies the respective regions; and
    calculating an integrated change region distribution by integrating the first change region distribution and the second change region distribution based on the first second weight parameters.

14. The tangible computer readable medium according to claim 13, wherein the detection of the second change region distribution is performed based on the brightness differences between the learned background image the respective pixels of the inputted image.

15. The tangible computer readable medium according to claim 13, wherein the illumination change generated in the inputted image further detected, and the calculation of the integrated change region distribution is performed such that the weight parameter of the second change region distribution is reduced when the illumination change is detected than when the illumination change is not detected.

16. The tangible computer readable medium according to claim 13, wherein detection of the information on the spatial frequency is performed such that (1) a removed learned background image is obtained by removing a component having relatively high spatial frequency from the learned background image, (2) a feature amount is calculated based on the spatial change pattern of the pixel value of the learned background image, and (3) a feature amount is calculated based on the spatial change pattern of the pixel value of the removed learned background image, wherein
    the calculation of the first and second weight parameters is performed such that the first weight parameter is larger than the second weight parameter in a region where the difference between the feature amounts is larger than a criterion when the feature amount calculated based on the learned background image and the feature amount calculated from the removed learned background image are compared with each other.

17. The tangible computer readable medium according to claim 13, wherein the detection of the second change region distribution is performed based on a change of brightness difference between a target pixel in the inputted image and a plurality of reference pixels which are arranged at positions spaced apart from the target pixel at least by a distance larger than an average size of an object to be detected in the inputted image.

18. The tangible computer readable medium according to claim 13, wherein the detection of the second change region distribution is performed based on a change of brightness difference between a target pixel in the inputted image and a plurality of pixels at preset positions.

* * * * *